April 3, 1956 T. VAN NORMAN 2,740,234
TRANSPLANTER
Filed March 31, 1952
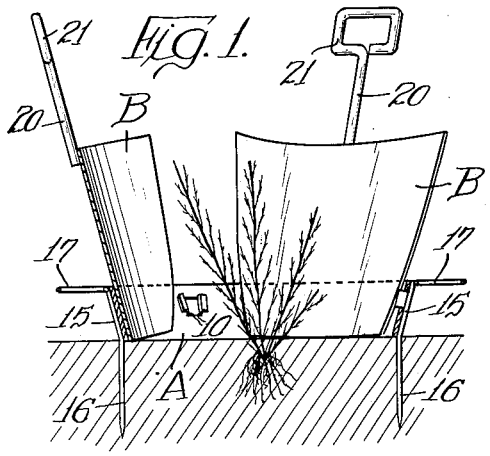
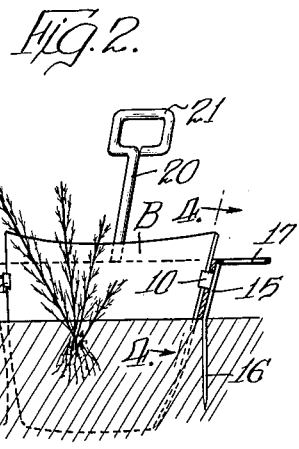
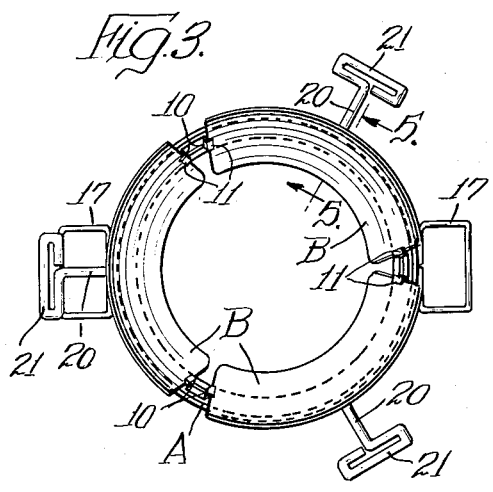
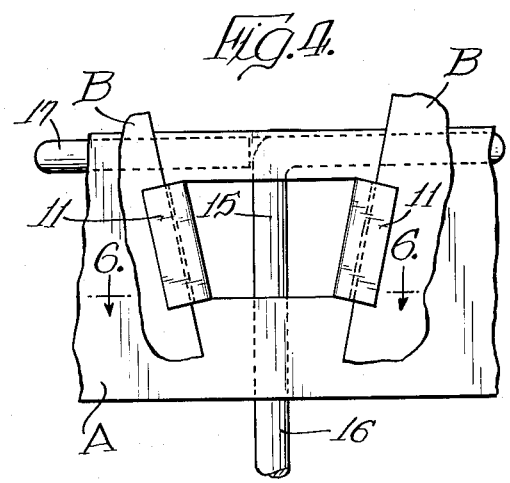
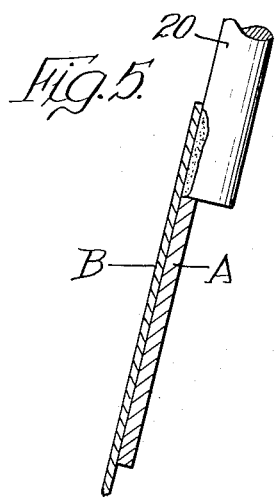
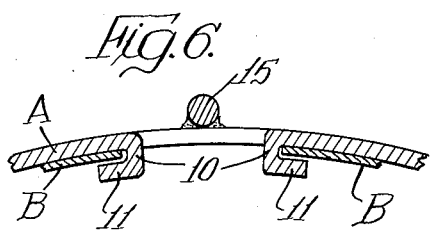
INVENTOR.
Truman Van Norman
BY
Behning & Behning
Attys.

United States Patent Office
2,740,234
Patented Apr. 3, 1956

2,740,234

TRANSPLANTER

Truman Van Norman, Naperville, Ill.

Application March 31, 1952, Serial No. 279,591

4 Claims. (Cl. 47—37)

This invention relates to a transplanter for use by gardeners or others when a plant is to be moved from one ground location to another.

For its objects I aim to provide a device of this character which is simple, inexpensive, sturdy, and easily operable under varying conditions.

A suggestive form of this invention is illustrated in the accompanying drawing wherein:

Figure 1 is a central vertical section through the transplanter as it appears when placed in a first position on the ground in surrounding relation to a plant that is to be moved;

Fig. 2 is a similar view showing the transplanter blades advanced into the ground to sever therefrom a ball of earth containing the roots of the plant that is to be moved;

Fig. 3 is a plan view of the transplanter with blades assembled in place;

Fig. 4 is a fragmentary elevational view, looking along line 4—4 of Fig. 2;

Fig. 5 is a fragmentary detail in vertical section, taken on line 5—5 of Fig. 3, and Fig. 6 is a similar view, taken on line 6—6 of Fig. 4.

The device consists essentially of an arcuate band A whose ends are suitably joined to produce a frusto-conical frame. Associated with such a frame is a plurality of blades B, each having a horizontal arcuate contour corresponding closely with that of the band frame. Three such blades are illustrated as this is the preferred number.

Upon the inner face of the frame are positioned a plurality of guides, arranged in pairs one for each blade. As shown, these guides consist in each case of a flange 10 which is struck inwardly from the band frame and then turned laterally to provide a lip 11 parallel with the band and in spaced relation thereto. Two such flanges, each with a lateral lip 11 facing away from the other, may be struck inwardly from the same opening in the band frame, as best shown in Fig. 3. The longitudinal edges of the blades which are substantially parallel are held slidably between a pair of facing guides to be confined thereby to reciprocable vertical movements only.

Rods 15 which are affixed to the band exterior extend therebelow parallel to the frame axis to provide prongs 16 which may be driven into the ground. Two such rods are shown, and each is outturned in the form of a handle 17 which may be conveniently seized whenever the transplanter is to be moved vertically or horizontally.

Affixed to each blade and extending upwardly therefrom is a shank 20 at whose upper end is a handle 21. The lower end of the shank is welded or otherwise fixedly secured to the convex side of the blade to terminate at a point relatively close to its upper end. When the blades are pushed downwardly, relative to the transplanter frame, they are free to advance to the point of the lower end of the handle shank 20 engaging with the band. Here the movement is arrested at a predetermined point which assures continued retention of each blade in its assembled relation with the band frame.

In use, the transplanter is placed on the ground in surrounding relation to the plant which is to be moved. In this operation the prongs 16 are advanced into the ground to hold the transplanter in a fixed position. The blades are then advanced downwardly into the ground usually in response to pressure applied by the foot on the upper edge of the blade. The handles of each blade may also be held while its advance continues, should it be desirable to further control this movement.

When the several blades have been advanced for their full distance into the ground, the earth containing the plant roots will be severed into the general form of a ball. The several blades converge toward each other in their downward movement so that the spacing between them is narrowed. Not only is the earth ball enclosed on all sides, but it is also engaged in part from below since the several blades constitute, in effect, an extension of the conical contour of the band frame.

With the blades surrounding the earth ball, the latter is ready to be freed for removal from the ground. In this operation the entire transplanter is lifted by the handles 17. In doing this, the blades remain in their down position, thereby supporting the earth ball between them. The transplanter with the earth ball so supported is then moved to the desired second position on the ground. At this point it is expected that a hole will have been prepared in the ground to receive the earth ball while still held by the transplanter blades in their down position. When placed in the hole, the earth surrounding the transplanter is moved back in place and packed; the blades are then pulled up, one or more at a time, thereby to free the earth ball for remaining in the ground and uniting itself with the surrounding earth. With all the blades so withdrawn, the transplanter in its entirety may then be lifted from the ground to be reused in other similar operations or be placed away in storage.

This invention will be found very useful for the transplanting of various plants. When not in use, it occupies but a small space, and its several parts are so proportioned as to be sturdy and capable of withstanding prolonged service. It is particularly advantageous in its operation because the blades are individually movable permitting, if necessary, one of the blades to be advanced only part way, but without appreciably impairing the effectiveness of the blades acting together to grasp the earth ball that is to be removed from the ground. This is an important factor since the resistance encountered to advance of the blades in the ground may often vary considerably.

I claim:

1. A transplanter having, in combination, a circular band in the form of a truncated cone adapted for horizontal placement, large end up, in a first position on the ground, a plurality of coacting guides interiorly of the band, arranged in pairs and equidistantly spaced apart circumferentially of the band, and a plurality of like blades of transversely arcuate contour corresponding closely with the curvature of the band and each slidingly engageable and confined at the sides thereof by a pair of the coacting guides for independent reciprocatory movements in a direction parallel with the band inclination relative to the vertical, the several blades when advanced downwardly into the ground defining between them a smaller truncated cone, constituting substantially an extension of the band, and supportingly enclosing an earth ball preliminary to and during movement of the transplanter in its entirety upwardly from the first position, then horizontally, and then downwardly into a second position on the ground.

2. A transplanter according to claim 1 wherein a pair of prongs, spaced apart about 180°, is fixedly mounted on the band and extended therefrom substantially parallel with its axis beyond the smaller band end for endwise advance into the ground to hold the transplanter in a fixed position thereupon.

3. A transplanter according to claim 2 wherein a handle shank is extended upwardly from the convex face of each blade in its upper portion and offset therefrom to engage the band to provide a stop for arresting downward movement of the blade at a predetermined point.

4. A transplanter having, in combination, a circular band in the form of a truncated cone adapted for horizontal placement, large end up, in a first position on the ground, a plurality of pairs of flanges outstruck from the band, with the flanges of each pair being bent in opposite directions to form oppositely facing lips, the lips in each of said pairs forming with the lips in adjacent pairs, a plurality of coacting guides arranged around the interior of the band and equidistantly spaced apart circumferentially of the band, a plurality of like blades of transversely arcuate contour corresponding closely with the curvature of the band and each slidingly engageable and confined at the sides thereof by a pair of the coacting guides for independent reciprocatory movements in a direction parallel with the band inclination relative to the vertical, the several blades when advanced downwardly into the ground defining between them a smaller truncated cone, constituting substantially an extension of the band, and supportingly enclosing an earth ball preliminary to and during movement of the transplanter in its entirety upwardly from the first position, then horizontally, and then downwardly into a second position on the ground, and a pair of prongs, spaced apart about 180°, fixedly mounted on the band and extended therefrom substantially parallel with its axis beyond the smaller band end for endwise advance into the ground to hold the transplanter in a fixed position thereupon, each prong at its upper end being extended outwardly from the band to provide a handle therefor.

References Cited in the file of this patent

UNITED STATES PATENTS

| 1,431,185 | Rowley | Oct. 10, 1922 |
| 2,243,955 | Gwathmey et al. | June 3, 1941 |
| 2,313,604 | Vogel | March 9, 1943 |

FOREIGN PATENTS

| 351,839 | Germany | Apr. 15, 1922 |